A. F. MASURY & A. G. HERRESHOFF.
GEAR SHIFTING MECHANISM.
APPLICATION FILED MAY 10, 1917.
1,241,414.
Patented Sept. 25, 1917.
2 SHEETS—SHEET 2.
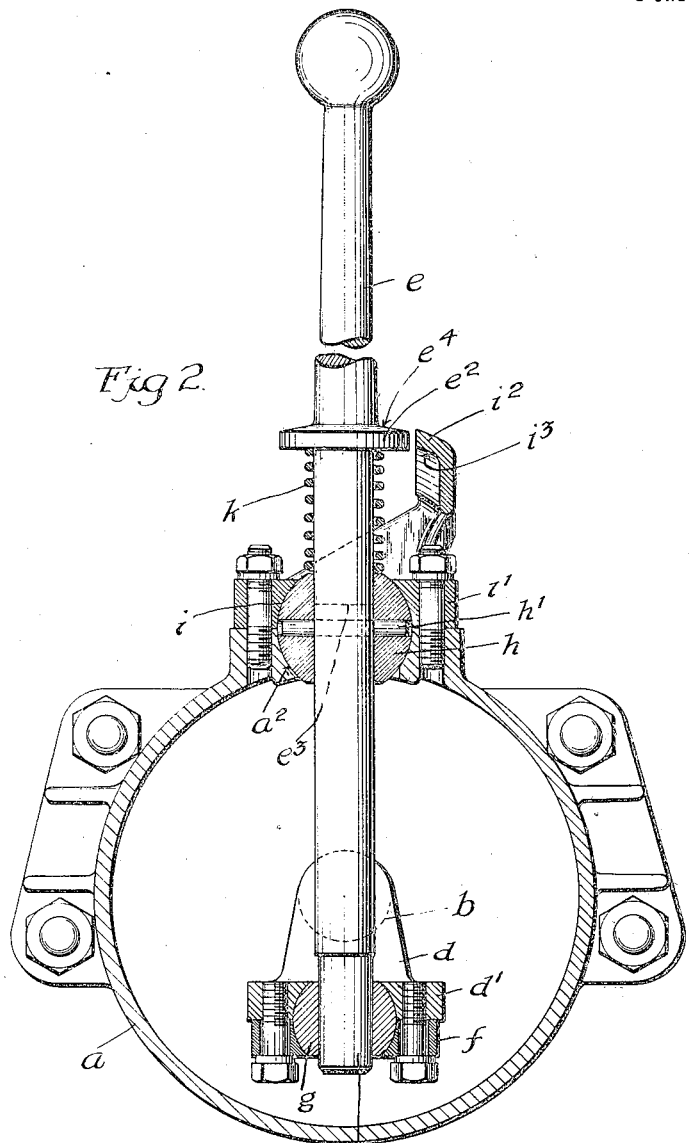
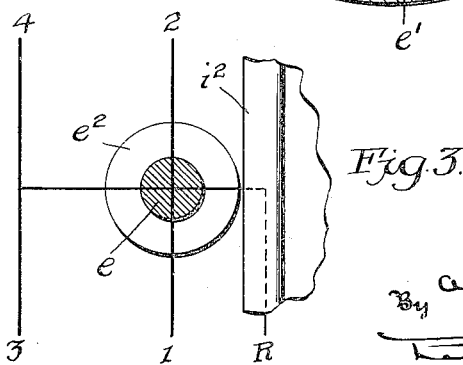

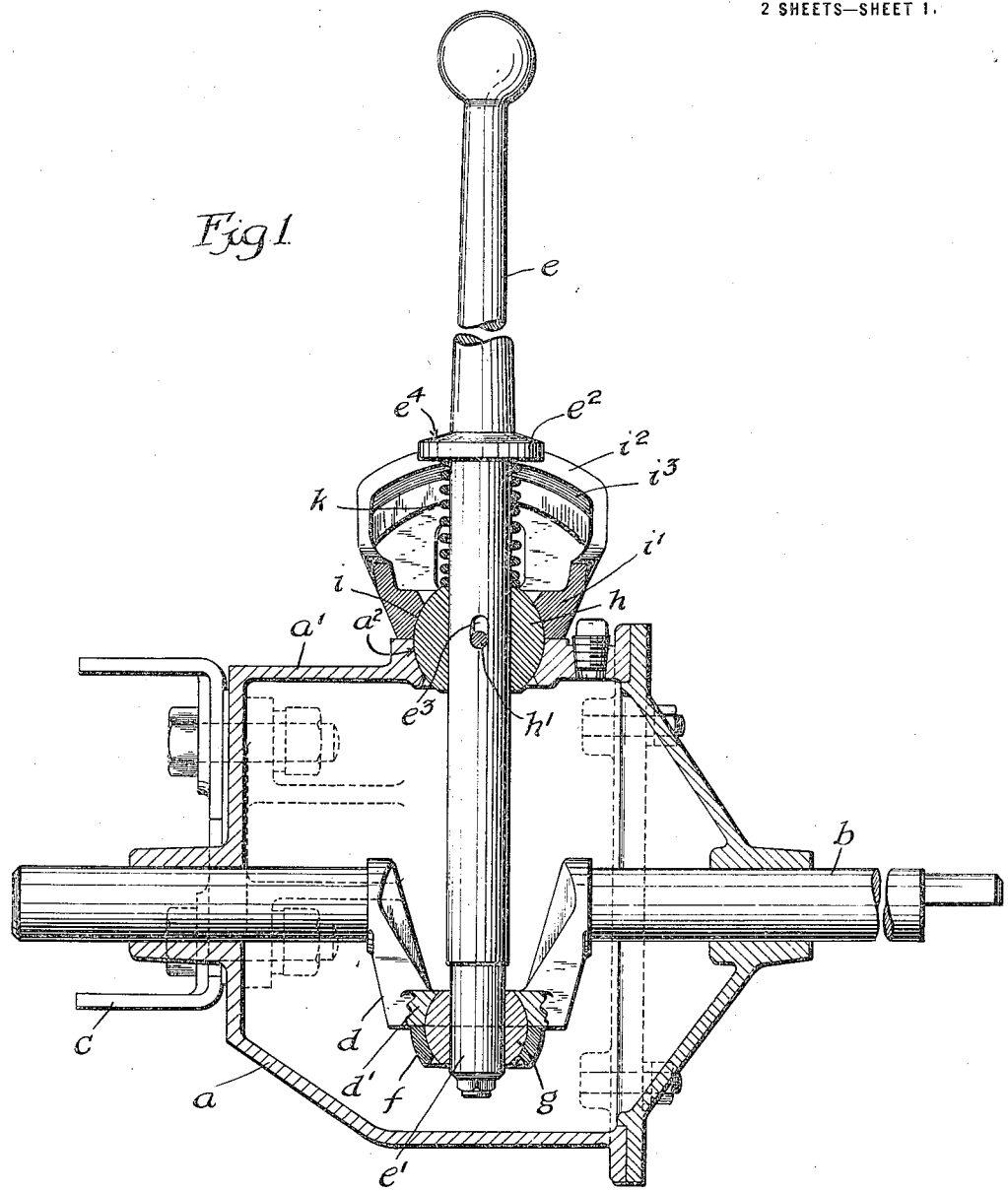

UNITED STATES PATENT OFFICE.

ALFRED F. MASURY AND ALEXANDER GRISWOLD HERRESHOFF, OF NEW YORK, N. Y., ASSIGNORS TO INTERNATIONAL MOTOR COMPANY, OF NEW YORK, N. Y., A CORPORATION OF DELAWARE.

GEAR-SHIFTING MECHANISM.

1,241,414.  Specification of Letters Patent.  Patented Sept. 25, 1917.

Application filed May 10, 1917. Serial No. 167,716.

*To all whom it may concern:*

Be it known that we, ALFRED F. MASURY and ALEXANDER G. HERRESHOFF, citizens of the United States, and residents of the borough of Manhattan of the city of New York, in the State of New York, have invented certain new and useful Improvements in Gear-Shifting Mechanism, of which the following is a specification, reference being had to the accompanying drawings, forming a part hereof.

This invention relates to mechanism for shifting the change speed gears of automobiles and is designed primarily with reference to its use with gears which permit four or more speeds and reverse to be effected. In automobile practice where three speeds and reverse are used, an H-gate or its equivalent affords a certain and convenient guide for the operator in manipulating the gear shifting lever. Where five or more positions of the shifting lever are required, as in four speeds and reverse, it is evident that the lever in its lateral movements must have more than two extreme positions. The difficulty of invariably positioning the shifting lever laterally in the desired one of its three possible positions has resulted in the use of locking devices, such as pawls, whereby the movements of the lever are limited normally to two positions sufficient, say, for the forward speeds, and these locking devices are released manually when the lever is to be rocked to its third possible lateral position, as for reverse. These locking devices, such as pawls, constitute, in themselves, mechanism entirely independent of the shifting lever, and are subject to frequent injury and derangement, and require especial and somewhat skilful manipulation to perform their intended functions when required. The object of the present invention is to eliminate such locking devices in association with shifting levers for four or more speeds and reverse, and yet provide a construction in which the lever is held positively against inadvertent movement to unintended positions where it might cause annoyance to the driver or injury to the transmission. In accordance with the invention the shifting lever itself is so constructed and mounted as to lock itself against movement to such unintended position while permitting easy and certain movement by special manipulation into such position when desired. One embodiment of the invention will be described in detail in connection with the accompanying drawings, although it is to be understood that the improvement resides primarily in a novel principle of operation of gear shifting mechanism shown therein and not in the particular structure illustrated herein. In the drawings—

Figure 1 is a view partly in vertical section and partly in side elevation of gear shifting mechanism embodying the invention.

Fig. 2 is a view in transverse section taken through the housing shown in Fig. 1.

Fig. 3 is a diagrammatic view indicating the various positions which the shifting lever of Figs. 1 and 2 may assume with relation to its neutral position, the paths of travel of the lever in reaching its various positions also being indicated.

The housing $a$ in which is journaled slidably the rock shaft $b$ for actuating selectively the transmission gearing (not illustrated) may be supported on the vehicle chassis in any convenient way, a transverse frame member $c$ of the chassis being indicated conventionally as the support for the housing in the drawings. The rock shaft $b$, it is to be understood, is connected operatively with the transmission gears in any approved manner, the invention not being limited in its application to a shifting member of any particular type. Within the housing $a$ is formed in the rocker shaft $b$ an offset crank section $d$ which is connected by a universal joint with the shifting lever $e$, this joint being of any form adapted to permit the intended operation. This portion of the construction as well as the support for the shifting lever $e$ in the top wall $a'$ of the housing may be substantially like that described in U. S. Patent No. 1,147,877. A simple universal connection between the crank shaft $d$ and the lower end of the shifting lever $e$ is made by forming a plate $d'$ in the crank $d$ and supporting on this plate a separate plate $f$, these two plates being curved interiorly to receive a spherical bearing member $g$ through which passes slidably the lower end $e'$ of the shifting lever. The ball and socket joint thus formed obviously permits a free universal movement between the shifting lever and the rocker shaft. The universal bearing provided for the shifting lever in the roof $a'$ of the housing $a$ may be substantially of the same form comprising a spherical bearing member $h$ through which the lever $e$ passes slidably and complementary curved portions $a^2$, $i$, formed respectively in the roof $a'$ and in a detachable guard plate $i'$, which is mounted on the housing $a$. By this construction a ball and socket connection between the lever $e$ and the housing is formed at this point.

The construction thus far described, or its equivalent, is shown clearly in the three speeds and reverse shifting mechanism of said Patent No. 1,147,877, and by it it will be evident that the shifting lever indicated in Fig. 3 may be moved from its neutral position rearwardly to first speed, numbered 1, then thrown forward to second speed, numbered 2, and then moved through the H-gate to high speed numbered 3, all in a manner known. Position numbered 4 of Fig. 3 in a three speed and reverse transmission might correspond to the position for reverse, and it is obvious that the lever could be thrown forward into that position. The present invention, it is to be remembered, is concerned with the operating mechanism for transmission gearing in which more than three speeds and reverse are available. The mechanism is shown in its application to four speeds forward and reverse. Referring to Fig. 3 again it will be evident that the reverse position of the gear shifting lever $e$ must be reached through an entirely independent lateral position apart from the two lateral positions heretofore indicated in connection with the forward speed positions 1, 2, 3, 4. In this connection it will be appreciated that some little skill on the part of the driver in manipulating the lever $e$ will be required to prevent the lever from being moved inadvertently to a position, say, opposite the reverse when it is intended that the lever should be moved to, say, a position opposite one of the forward speeds. This objection is well known in the art and it has been proposed to meet it by providing locking devices, such as pawls, to prevent the lever $e$ from being thrown to the reverse position without special manipulation and release of such locking devices. In such constructions the normal operation of the lever permits it to be moved only to the lateral positions necessary to throw the gears for either first or second speed or third and fourth speed. When the locking devices are released by manual manipulation the lever may then be rocked to its third lateral position and thrown into reverse. By the present invention it is sought to eliminate these separate and relatively troublesome latches or locking devices for holding the lever against inadvertent movement into reverse and to so construct and mount the gear lever as to constitute it a part of the locking mechanism for holding it against such inadvertent movement. As shown in the drawings the lever $e$ may be slid axially through the bearing balls $g$, $h$, but is normally held in its extreme upward position by means of a spiral spring $k$ which may be interposed between the bearing ball $h$ and the collar or circular boss $e^2$ carried on the lever above the guard plate $i'$. The upward movement of the lever, as well as the downward movement thereof, may be limited by means of a slot and stud connection between the lever and the bearing ball $h$, the slot $e^3$ being formed in the lever to receive a transverse stud $h'$ carried by the bearing ball $h$. The length of the slot $e^3$ obviously determines the extent of the axial movement of the lever. On the guard plate $i'$ is carried or formed a curved flange $i^2$, the edge of which is disposed opposite the collar $e^2$ of the lever $e$ when the lever is in its extreme upward position. The flange $i^2$ is curved to conform to the arcuate path of travel of the collar $e^2$ during the rocking movements of the lever to and fro in the shifting of the gears, so that the edge of the flange is always opposite the collar $e^2$, no matter what the position of the lever in normal operation. The relation of the edge of the flange $i^2$ to the collar $e^2$ is such that the lever normally cannot be moved laterally to the position for reverse, but is limited in its lateral movement in one direction to a position for, say, first and second speeds, numbered 1 and 2 in Fig. 3. The spring $k$ holds the lever normally in its extreme upward position so that this relation between the flange $i^2$ and the collar $e^2$ is maintained. In this condition, the operator can shift the lever $e$ freely through the four positions for the four forward speeds without danger of shifting the gears into reverse. The lever is held positively by reason of its construction against such inadvertent movement into reverse during normal operation. If it is desired to throw the gears into reverse the operator depresses the lever $e$ against the action of the spring $k$ until the collar or boss $e$ is moved below the flange $i^2$ in which position it is obviously possible to rock the lever $e$ laterally to its third position and bring the collar $e^2$ below the flange $i^2$. Such movement of the lever $e$ brings it opposite the reverse way, and it can be readily rocked forwardly or rearwardly depending upon the particular construction of the transmission. When the gears are moved out of reverse and the lever brought to its usual median position, it will be rocked into the neutral position shown in Fig. 3, this return being largely automatic by reason of the pressure of the spring $k$ and, if desired, the curved under-face $i^3$ of the flange and the coöperating curved upper-face $e^4$ of the collar or boss $e^2$. In fact this portion of the construction may be such that the operator need only move the lever forward to its median position when it will be free to rock laterally under the influence of the spring $k$. When thus restored to its neutral position, it is evident that the boss $e^2$ will be brought into alinement with the edge of the flange $i^2$ and thereby lock the lever against return movement to reverse.

While the particular embodiment of the invention has been described herein with great detail, since it is believed that such a description of a specific application of the invention will be conducive to a clear understanding thereof, it is to be emphasized that the invention is not limited to the number of speeds employed, to the particular type of transmission or actuating element therefor, corresponding to the rock shaft $b$, nor to the particular coöperating locking elements on the lever and its housing, corresponding to the collar $e^2$ and flange $i^2$. For instance, the lever might be formed with an abutment of some other character at some other portion either within or without the housing $a$ and such an abutment might coöperate with another relatively fixed abutment carried either within or without the housing. Again, the types of bearings shown herein and the particular means for limiting the axial movements of the lever are not required for the incorporation of the principle of the invention in shifting mechanism. The claims will better define the scope of the invention.

We claim as our invention:

1. In gear shifting mechanism, a shifting lever having a universal movement and movable laterally into two extreme positions, a housing in which the lever is supported and coöperating abutments on the lever and the housing to hold the lever normally against lateral movement beyond such two positions, said lever being slidable axially to disaline said abutments.

2. In gear shifting mechanism, a shifting lever having a universal movement and movable laterally into two extreme positions, a bearing in which the lever is slidably supported, coöperating abutments on the lever and the housing to hold the lever normally against lateral movement beyond said two positions and a spring to hold the lever yieldingly against axial movement to disaline said abutments.

3. In gear shifting mechanism in combination with a rock shaft, a shifting lever connected flexibly thereto and movable laterally into two extreme positions, a housing in which the rock shaft is slidably journaled, a universal bearing for the lever in the housing and coöperating abutments on the lever and the housing to hold the lever normally against lateral movement beyond such two positions, said lever being slidable axially through the bearing to disaline the said abutments.

4. In gear shifting mechanism, a shifting lever having a universal movement and movable laterally into two extreme positions for four forward speeds, a housing in which the lever is supported and coöperating abutments on the lever and the housing to hold the lever normally against lateral movement beyond such two positions for reverse, said lever being slidable axially to disaline said abutments and permit the lever to be moved into reverse position.

5. In gear shifting mechanism in combination with a rock shaft, a shifting lever connected flexibly thereto and movable laterally into two extreme positions for four forward speeds, a universal bearing in which the lever is slidably mounted, a slot and stud connection between the lever and the bearing to limit the axial movement of the lever, coöperating abutments on the lever and the housing to hold the lever against lateral movement beyond such two positions and a spring to maintain the abutments yieldingly in alinement, said lever being capable of depression manually against the action of the spring to disaline the abutments for movement into reverse position.

6. In gear shifting mechanism in combination with a rock shaft, a shifting lever connected flexibly thereto and movable laterally into two extreme positions, a housing in which the rock shaft is slidably journaled, a universal bearing for the lever in the housing, said lever being movable axially through the bearing, a circular boss on the lever without the housing, a flanged abutment carried on the housing to coöperate with the boss and hold the lever against lateral movement beyond such two positions, and a spring to maintain the boss in alinement with the flanged abutment, said lever being capable of being depressed against the action of the spring to move the boss below the flanged abutment.

This specification signed this 5th day of May 1917.

ALFRED F. MASURY.
ALEXANDER GRISWOLD HERRESHOFF.